(12) United States Patent
Borch et al.

(10) Patent No.: US 10,076,121 B2
(45) Date of Patent: Sep. 18, 2018

(54) METHOD OF BAKING

(71) Applicant: Novozymes A/S, Bagsvaerd (DK)

(72) Inventors: Kim Borch, Birkeroed (DK); Tina Salomonsen, Copenhagen (DK); Tom Anton Busk Nielsen, Chiba (JP); Kirk Matthew Schnorr, Holte (DK)

(73) Assignee: Novozymes A/S, Bagsvaerd (DK)

( * ) Notice: Subject to any disclaimer, the term of this patent is extended or adjusted under 35 U.S.C. 154(b) by 0 days.

(21) Appl. No.: 14/383,660

(22) PCT Filed: Mar. 14, 2013

(86) PCT No.: PCT/EP2013/055255
§ 371 (c)(1),
(2) Date: Sep. 8, 2014

(87) PCT Pub. No.: WO2013/135822
PCT Pub. Date: Sep. 19, 2013

(65) Prior Publication Data
US 2015/0017281 A1    Jan. 15, 2015

Related U.S. Application Data

(60) Provisional application No. 61/611,299, filed on Mar. 15, 2012.

(30) Foreign Application Priority Data

Mar. 14, 2012    (EP) .................................... 12159464

(51) Int. Cl.
| | | |
|---|---|---|
| *A21D 8/04* | (2006.01) | |
| *A21D 2/14* | (2006.01) | |
| *A21D 2/16* | (2006.01) | |
| *A21D 2/22* | (2006.01) | |
| *A21D 10/00* | (2006.01) | |

(52) U.S. Cl.
CPC ............. *A21D 8/042* (2013.01); *A21D 2/145* (2013.01); *A21D 2/16* (2013.01); *A21D 2/22* (2013.01); *A21D 10/002* (2013.01)

(58) Field of Classification Search
CPC ...................................................... A21D 8/042
USPC ...................................... 426/18, 61, 64, 549
See application file for complete search history.

(56) References Cited

U.S. PATENT DOCUMENTS

| | | | |
|---|---|---|---|
| 6,103,505 A | 8/2000 | Clausen | |
| 2008/0038404 A1* | 2/2008 | Brunstedt | ............. A21D 8/042 426/32 |
| 2011/0236531 A1 | 9/2011 | Tsukazaki et al. | |

FOREIGN PATENT DOCUMENTS

| | | |
|---|---|---|
| WO | 1998/26057 A1 | 6/1998 |
| WO | 2001/47363 A1 | 7/2001 |
| WO | 2009/106575 A1 | 9/2009 |

OTHER PUBLICATIONS

Hille et al, 2007, Alimentaria, vol. 388, pp. 91-92.

* cited by examiner

*Primary Examiner* — Hamid R Badr
(74) *Attorney, Agent, or Firm* — Kelly Reynolds

(57) ABSTRACT

Disclosed is the making of baked products, more particularly making of baked products using polypeptides having lipolytic activity and at least one emulsifier. The invention also relates to compositions comprising polypeptides having lipolytic activity and at least one emulsifier.

17 Claims, No Drawings
Specification includes a Sequence Listing.

SEQUENCE LISTING

```
<160> NUMBER OF SEQ ID NOS: 3

<210> SEQ ID NO 1
<211> LENGTH: 894
<212> TYPE: DNA
<213> ORGANISM: Aspergillus aculeatus
<220> FEATURE:
<221> NAME/KEY: CDS
<222> LOCATION: (1)..(891)

<400> SEQUENCE: 1 atg ttc tct gga ctc tat atc act cgg ttg agc gga gtg gtg gcc gct    48
Met Phe Ser Gly Leu Tyr Ile Thr Arg Leu Ser Gly Val Val Ala Ala
1               5                  10                  15
```

| | | | | | | | | | | | | | | | | |
|---|---|---|---|---|---|---|---|---|---|---|---|---|---|---|---|---|
| ctt | gcg | gcc | ttg | gtt | gtg | gct | gct | ccg | gtc | gat | att | cga | gat | gtc | tcg | 96 |
| Leu | Ala | Ala | Leu | Val | Val | Ala | Ala | Pro | Val | Asp | Ile | Arg | Asp | Val | Ser | |
| | | 20 | | | | | 25 | | | | | 30 | | | | |
| acc | act | gtc | tac | acg | cag | ctg | gat | ctg | ttc | gcg | cag | tac | tcc | gcc | gcg | 144 |
| Thr | Thr | Val | Tyr | Thr | Gln | Leu | Asp | Leu | Phe | Ala | Gln | Tyr | Ser | Ala | Ala | |
| | | 35 | | | | | 40 | | | | | 45 | | | | |
| gca | tac | tgc | tcg | acc | aac | ctc | gat | tcc | ccg | aat | acg | agc | gtg | act | tgc | 192 |
| Ala | Tyr | Cys | Ser | Thr | Asn | Leu | Asp | Ser | Pro | Asn | Thr | Ser | Val | Thr | Cys | |
| 50 | | | | | 55 | | | | | 60 | | | | | | |
| acg | aac | gga | ctt | tgt | ccg | tta | ctc | gca | gcc | gcc | acg | acc | aag | agc | ctg | 240 |
| Thr | Asn | Gly | Leu | Cys | Pro | Leu | Leu | Ala | Ala | Ala | Thr | Thr | Lys | Ser | Leu | |
| 65 | | | | 70 | | | | | 75 | | | | | 80 | | |
| gct | gaa | ttc | gag | gca | tcc | gat | tcc | tac | ggc | gat | aca | gcg | gga | ttc | ctc | 288 |
| Ala | Glu | Phe | Glu | Ala | Ser | Asp | Ser | Tyr | Gly | Asp | Thr | Ala | Gly | Phe | Leu | |
| | | | | 85 | | | | | 90 | | | | | 95 | | |
| gtg | gtt | gac | tcc | acc | aac | aag | aaa | ttg | gtg | gtg | tca | ttc | cgc | gga | agc | 336 |
| Val | Val | Asp | Ser | Thr | Asn | Lys | Lys | Leu | Val | Val | Ser | Phe | Arg | Gly | Ser | |
| | | | 100 | | | | | 105 | | | | | 110 | | | |
| agc | tcg | atc | gag | aac | tgg | ata | gcc | aat | ttg | gac | ttt | atc | ttc | acg | gat | 384 |
| Ser | Ser | Ile | Glu | Asn | Trp | Ile | Ala | Asn | Leu | Asp | Phe | Ile | Phe | Thr | Asp | |
| | | 115 | | | | | 120 | | | | | 125 | | | | |
| gcc | agc | gcg | gtc | tgc | agt | ggc | tgc | cag | gtt | cac | cag | ggc | ttc | tgg | aag | 432 |
| Ala | Ser | Ala | Val | Cys | Ser | Gly | Cys | Gln | Val | His | Gln | Gly | Phe | Trp | Lys | |
| 130 | | | | | 135 | | | | | 140 | | | | | | |
| gcc | tgg | agc | tcc | gtc | gca | gac | acc | cta | aca | gcg | gag | atc | gcg | tct | gcg | 480 |
| Ala | Trp | Ser | Ser | Val | Ala | Asp | Thr | Leu | Thr | Ala | Glu | Ile | Ala | Ser | Ala | |
| 145 | | | | 150 | | | | | 155 | | | | | 160 | | |
| gtc | act | gcg | tac | ccc | ggc | tat | agc | ctg | gtt | ttc | acg | ggg | cat | agt | ctg | 528 |
| Val | Thr | Ala | Tyr | Pro | Gly | Tyr | Ser | Leu | Val | Phe | Thr | Gly | His | Ser | Leu | |
| | | | 165 | | | | | 170 | | | | | 175 | | | |
| ggg | ggc | gcg | ttg | gcg | acc | att | ggc | gcg | acg | gtg | ctg | cgg | aat | gca | gga | 576 |
| Gly | Gly | Ala | Leu | Ala | Thr | Ile | Gly | Ala | Thr | Val | Leu | Arg | Asn | Ala | Gly | |
| | | 180 | | | | | 185 | | | | | 190 | | | | |
| tac | tcc | gtt | caa | ctg | tat | tcc | tac | gga | gct | cca | cga | gtg | ggc | aac | acg | 624 |
| Tyr | Ser | Val | Gln | Leu | Tyr | Ser | Tyr | Gly | Ala | Pro | Arg | Val | Gly | Asn | Thr | |
| | | 195 | | | | | 200 | | | | | 205 | | | | |
| gcg | ctg | gcc | aac | tat | atc | acg | agc | aaa | ggc | tct | ggc | tcg | aat | ttc | cga | 672 |
| Ala | Leu | Ala | Asn | Tyr | Ile | Thr | Ser | Lys | Gly | Ser | Gly | Ser | Asn | Phe | Arg | |
| 210 | | | | | 215 | | | | | 220 | | | | | | |
| gtg | act | cac | ctc | aac | gac | gtc | gtg | cct | agg | ctt | cca | ccc | agg | ttg | ctt | 720 |
| Val | Thr | His | Leu | Asn | Asp | Val | Val | Pro | Arg | Leu | Pro | Pro | Arg | Leu | Leu | |
| 225 | | | | 230 | | | | | 235 | | | | | 240 | | |
| ggt | tat | agt | cac | ccg | agc | ccg | gaa | tac | tgg | atc | acc | agc | gga | act | ggc | 768 |
| Gly | Tyr | Ser | His | Pro | Ser | Pro | Glu | Tyr | Trp | Ile | Thr | Ser | Gly | Thr | Gly | |
| | | | | 245 | | | | | 250 | | | | | 255 | | |
| gct | gca | gtg | acc | tcg | tcg | gat | att | gat | atc | att | cag | ggt | gtt | gac | tct | 816 |
| Ala | Ala | Val | Thr | Ser | Ser | Asp | Ile | Asp | Ile | Ile | Gln | Gly | Val | Asp | Ser | |
| | | | 260 | | | | | 265 | | | | | 270 | | | |
| tct | gct | ggc | aac | gcg | ggg | gag | aat | atc | acg | agc | gtg | ctg | gcg | cac | ctg | 864 |
| Ser | Ala | Gly | Asn | Ala | Gly | Glu | Asn | Ile | Thr | Ser | Val | Leu | Ala | His | Leu | |
| | | 275 | | | | | 280 | | | | | 285 | | | | |
| tgg | tac | ttc | atc | agt | atc | ggc | act | tgt | tga | | | | | | | 894 |
| Trp | Tyr | Phe | Ile | Ser | Ile | Gly | Thr | Cys | | | | | | | | |
| | | 290 | | | | | 295 | | | | | | | | | |

<210> SEQ ID NO 2
<211> LENGTH: 297
<212> TYPE: PRT
<213> ORGANISM: Aspergillus aculeatus

<400> SEQUENCE: 2

```
Met Phe Ser Gly Leu Tyr Ile Thr Arg Leu Ser Gly Val Val Ala Ala
1               5                   10                  15

Leu Ala Ala Leu Val Val Ala Ala Pro Val Asp Ile Arg Asp Val Ser
            20                  25                  30

Thr Thr Val Tyr Thr Gln Leu Asp Leu Phe Ala Gln Tyr Ser Ala Ala
        35                  40                  45

Ala Tyr Cys Ser Thr Asn Leu Asp Ser Pro Asn Thr Ser Val Thr Cys
50                  55                  60

Thr Asn Gly Leu Cys Pro Leu Leu Ala Ala Ala Thr Thr Lys Ser Leu
65                  70                  75                  80

Ala Glu Phe Glu Ala Ser Asp Ser Tyr Gly Asp Thr Ala Gly Phe Leu
                85                  90                  95

Val Val Asp Ser Thr Asn Lys Lys Leu Val Val Ser Phe Arg Gly Ser
            100                 105                 110

Ser Ser Ile Glu Asn Trp Ile Ala Asn Leu Asp Phe Ile Phe Thr Asp
        115                 120                 125

Ala Ser Ala Val Cys Ser Gly Cys Gln Val His Gln Gly Phe Trp Lys
130                 135                 140

Ala Trp Ser Ser Val Ala Asp Thr Leu Thr Ala Glu Ile Ala Ser Ala
145                 150                 155                 160

Val Thr Ala Tyr Pro Gly Tyr Ser Leu Val Phe Thr Gly His Ser Leu
                165                 170                 175

Gly Gly Ala Leu Ala Thr Ile Gly Ala Thr Val Leu Arg Asn Ala Gly
            180                 185                 190

Tyr Ser Val Gln Leu Tyr Ser Tyr Gly Ala Pro Arg Val Gly Asn Thr
        195                 200                 205

Ala Leu Ala Asn Tyr Ile Thr Ser Lys Gly Ser Gly Ser Asn Phe Arg
210                 215                 220

Val Thr His Leu Asn Asp Val Val Pro Arg Leu Pro Pro Arg Leu Leu
225                 230                 235                 240

Gly Tyr Ser His Pro Ser Pro Glu Tyr Trp Ile Thr Ser Gly Thr Gly
                245                 250                 255

Ala Ala Val Thr Ser Ser Asp Ile Asp Ile Gln Gly Val Asp Ser
            260                 265                 270

Ser Ala Gly Asn Ala Gly Glu Asn Ile Thr Ser Val Leu Ala His Leu
        275                 280                 285

Trp Tyr Phe Ile Ser Ile Gly Thr Cys
290                 295
```

<210> SEQ ID NO 3
<211> LENGTH: 294
<212> TYPE: PRT
<213> ORGANISM: Aspergillus japonicus

<400> SEQUENCE: 3

```
Met Val Tyr Phe Thr Arg Leu Gly Gly Val Val Ala Ala Leu Ala Ala
1               5                   10                  15

Leu Val Val Ala Ala Pro Val Asp Ile Arg Asp Val Ser Thr Thr Val
            20                  25                  30

Tyr Thr Gln Leu Asp Leu Phe Ala Gln Tyr Ser Ala Ala Tyr Cys
        35                  40                  45

Ser Thr Asn Leu Asp Ser Pro Asn Thr Ser Val Thr Cys Thr Asn Gly
50                  55                  60

Leu Cys Pro Leu Leu Ala Ala Ala Thr Thr Lys Ser Leu Ala Glu Phe
```

```
                65                  70                  75                  80
Glu Ala Ser Asp Ser Tyr Gly Asp Thr Ala Gly Phe Leu Val Val Asp
                    85                  90                  95

Ser Thr Asn Lys Lys Leu Val Val Ser Phe Arg Gly Ser Ser Ser Ile
                100                 105                 110

Glu Asn Trp Ile Ala Asn Leu Asp Phe Ile Phe Thr Asp Ala Ser Ala
            115                 120                 125

Val Cys Ser Gly Cys Gln Val His Gln Gly Phe Trp Lys Ala Trp Ser
        130                 135                 140

Ser Val Ala Asp Thr Leu Thr Thr Glu Ile Ala Ser Ala Val Thr Ala
145                 150                 155                 160

Tyr Pro Gly Tyr Ser Leu Val Phe Thr Gly His Ser Leu Gly Gly Ala
                165                 170                 175

Leu Ala Thr Ile Gly Ala Thr Val Leu Arg Asn Ala Gly Tyr Ser Val
            180                 185                 190

Gln Leu Tyr Ser Tyr Gly Ala Pro Arg Val Gly Asn Thr Ala Leu Ala
        195                 200                 205

Asn Tyr Ile Thr Ser Lys Gly Ser Gly Ser Asn Phe Arg Val Thr His
    210                 215                 220

Leu Asn Asp Val Val Pro Arg Leu Pro Pro Arg Leu Leu Gly Tyr Ser
225                 230                 235                 240

His Pro Ser Pro Glu Tyr Trp Ile Thr Ser Gly Thr Gly Ala Ala Val
                245                 250                 255

Thr Ser Ser Asp Ile Asp Ile Ile Gln Gly Val Asp Ser Ser Ala Gly
            260                 265                 270

Asn Ala Gly Glu Asn Ile Thr Ser Val Leu Ala His Leu Trp Tyr Phe
        275                 280                 285

Ile Ser Ile Gly Thr Cys
290
```

METHOD OF BAKING

CROSS-REFERENCE TO RELATED APPLICATIONS

This application is a 35 U.S.C. 371 national application of PCT/EP2013/055255 filed Mar. 14, 2013 which claims priority or the benefit under 35 U.S.C. 119 of European application no. 12159464.2 filed Mar. 14, 2012 and U.S. provisional application No. 61/611,299 filed Mar. 15, 2012, the contents of which are fully incorporated herein by reference.

REFERENCE TO A SEQUENCE LISTING

This application contains a Sequence Listing in computer readable form, which is incorporated herein by reference.

BACKGROUND OF THE INVENTION

Field of the Invention

The present invention relates to the making of baked products, more particularly making of baked products using polypeptides having lipolytic activity and at least one emulsifier. The invention also relates to compositions comprising polypeptides having lipolytic activity and at least one emulsifier.

Description of the Related Art

Emulsifiers such as diacetyl tartaric acid esters of monoglycerides (DATEM) and sodium stearoyl lactylate (SSL) are commonly used in the production of baked products, such as bread. Emulsifiers work i.a. by strengthening the dough gluten protein network for better gas retention, improved texture, increased volume and increased shelf life.

Lipolytic enzymes having activity towards polar flour lipids provide an alternative to traditionally used dough stabilizing emulsifiers. Lipolytic enzymes hydrolyze one or more of the fatty acids from lipids present in the food which can result in the formation of powerful emulsifier molecules within the foodstuff which provide commercially valuable functionality. The molecules which contribute the most significant emulsifier characteristics are the partial hydrolysis products, such as lyso-phospholipids, lyso-glycolipids and mono-glyceride molecules. The polar lipid hydrolysis products, namely lyso-phospholipids and lyso-glycolipids, are particularly advantageous. In bread making, such in situ derived emulsifiers can give equivalent functionality as added emulsifiers, such as DATEM and SSL.

The lipolytic enzyme Lipopan F, which originates from *Fusarium oxysporum* and was disclosed in WO 98/26057, has been known in the baking industry for several years, and is used for e.g. improved texture, and increased volume of the baked product.

The patent application PCT/JP2008/051386 published as WO 2008/093720 discloses a lipolytic enzyme from *Aspergillus japonicus* which is 98.6% identical to the present lipolytic enzyme from *Aspergillus aculeatus*. The lipolytic enzyme from *A. japonicus* is applied as a baking enzyme and as a replacer of "synthetic surfactants" (emulsifiers) in baking but the lipolytic enzyme is not applied together with an emulsifier.

SUMMARY OF THE INVENTION

The inventors have now found that the addition of an emulsifier and a particular lipolytic enzyme, to a dough has a synergistic effect on the volume of the baked product made from the dough. This finding is highly surprising as no such synergistic effect is observed when the well known baking lipolytic enzyme Lipopan F is added together with an emulsifier. The particular lipolytic enzyme may be derived from *Aspergillus aculeatus* and has activity towards phospholipids and/or glycolipids and/or triglycerides.

High amounts of emulsifier are used in the bread industry. The particular lipolytic enzyme can potentially replace part of the emulsifier in a baking recipe.

Accordingly, the invention provides in a first aspect a method for preparing a dough or a baked product prepared from the dough which method comprises incorporating into the dough a lipolytic enzyme and an emulsifier, wherein the lipolytic enzyme is an isolated polypeptide selected from the group consisting of;
  (a) a polypeptide having an amino acid sequence which has at least 70% sequence identity to the mature polypeptide of SEQ ID NO: 2;
  (b) a polypeptide encoded by a polynucleotide that hybridizes under high stringency conditions with (i) the mature polypeptide coding sequence of SEQ ID NO: 1, or (ii) the full-length complement of (i);
  (c) a polypeptide encoded by a polynucleotide having at least 70% sequence identity to the mature polypeptide coding sequence of SEQ ID NO: 1;
  (d) a variant of the mature polypeptide of SEQ ID NO: 2 comprising a substitution, deletion, and/or insertion at one or more (e.g. several) positions; and
  (e) a fragment of the polypeptide of (a), (b), (c), or (d) that has lipolytic activity.

The invention provides in a second aspect a baking composition comprising an emulsifier and a lipolytic enzyme which is an isolated polypeptide selected from the group consisting of;
  (a) a polypeptide having an amino acid sequence which has at least 70% sequence identity to the mature polypeptide of SEQ ID NO: 2;
  (b) a polypeptide encoded by a polynucleotide that hybridizes under high stringency conditions with (i) the mature polypeptide coding sequence of SEQ ID NO: 1, or (ii) the full-length complement of (i);
  (c) a polypeptide encoded by a polynucleotide having at least 70% sequence identity to the mature polypeptide coding sequence of SEQ ID NO: 1;
  (d) a variant of the mature polypeptide of SEQ ID NO: 2 comprising a substitution, deletion, and/or insertion at one or more (e.g. several) positions; and
  (e) a fragment of the polypeptide of (a), (b), (c), or (d) that has lipolytic activity.

In further aspects the invention provides a pre-mix and a dough prepared with the baking composition of the second aspect and a use of the baking composition, the pre-mix or the dough for preparing a baked product. In a final aspect the invention provides a baked product obtained by baking the dough.

Definitions

Lipolytic enzyme: The term "lipolytic enzyme" encompasses enzymes having lipase, phospholipase and/or galactolipase activity (a.k.a. glyceroglycolipid lipase) activity. The term "lipolytic enzyme" is used interchangeable with the term "polypeptides having lipolytic activity".

Phospholipase activity: Phospholipase activity (A1 or A2, EC 3.1.1.32 or 3.1.1.4), i.e. hydrolytic activity towards one or both carboxylic ester bonds in phospholipids such as lecithin.

Galactolipase activity: Galactolipase activity (EC 3.1.1.26), i.e. hydrolytic activity on carboxylic ester bonds in galactolipids such as DGDG (digalactosyl diglyceride).

Lipase activity: Triacylglycerol lipase activity (EC 3.1.1.3), i.e. hydrolytic activity for carboxylic ester bonds in triglycerides, e.g. olive oil and tributyrin.

Coding sequence: The term "coding sequence" means a polynucleotide, which directly specifies the amino acid sequence of a polypeptide. The boundaries of the coding sequence are generally determined by an open reading frame, which begins with a start codon such as ATG, GTG, or TTG and ends with a stop codon such as TAA, TAG, or TGA. The coding sequence may be a genomic DNA, cDNA, synthetic DNA, or a combination thereof.

Fragment: The term "fragment" means a polypeptide having one or more (e.g. several) amino acids absent from the amino and/or carboxyl terminus of a mature polypeptide or domain; wherein the fragment has lipolytic activity.

Host cell: The term "host cell" means any cell type that is susceptible to transformation, transfection, transduction, or the like with a nucleic acid construct or expression vector comprising a polynucleotide of the present invention. The term "host cell" encompasses any progeny of a parent cell that is not identical to the parent cell due to mutations that occur during replication.

Isolated: The term "isolated" means a substance in a form or environment that does not occur in nature. Non-limiting examples of isolated substances include (1) any non-naturally occurring substance, (2) any substance including, but not limited to, any enzyme, variant, nucleic acid, protein, peptide or cofactor, that is at least partially removed from one or more or all of the naturally occurring constituents with which it is associated in nature; (3) any substance modified by the hand of man relative to that substance found in nature; or (4) any substance modified by increasing the amount of the substance relative to other components with which it is naturally associated (e.g. multiple copies of a gene encoding the substance; use of a stronger promoter than the promoter naturally associated with the gene encoding the substance). An isolated substance may be present in a fermentation broth sample.

Mature polypeptide: The term "mature polypeptide" means a polypeptide in its final form following translation and any post-translational modifications, such as N-terminal processing, C-terminal truncation, glycosylation, phosphorylation, etc. In one aspect, the mature polypeptide is amino acids 24 to 297 of SEQ ID NO: 2. Amino acids 1 to 23 of SEQ ID NO: 2 are a signal peptide.

Mature polypeptide coding sequence: The term "mature polypeptide coding sequence" means a polynucleotide that encodes a mature polypeptide having lipolytic activity. In one aspect, the mature polypeptide coding sequence is nucleotides 70 to 891 of SEQ ID NO: 1. Nucleotides 1 to 69 of SEQ ID NO: 1 encode the signal peptide.

Sequence identity: The relatedness between two amino acid sequences or between two nucleotide sequences is described by the parameter "sequence identity". For purposes of the present invention, the sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 5.0.0 or later. The parameters used are gap open penalty of 10, gap extension penalty of 0.5, and the EBLOSUM62 (EMBOSS version of BLOSUM62) substitution matrix. The output of Needle labeled "longest identity" (obtained using the -nobrief option) is used as the percent identity and is calculated as follows:

(Identical Residues×100)/(Length of Alignment−
Total Number of Gaps in Alignment)

For purposes of the present invention, the sequence identity between two deoxyribonucleotide sequences is determined using the Needleman-Wunsch algorithm (Needleman and Wunsch, 1970, supra) as implemented in the Needle program of the EMBOSS package (EMBOSS: The European Molecular Biology Open Software Suite, Rice et al., 2000, supra), preferably version 5.0.0 or later. The parameters used are gap open penalty of 10, gap extension penalty of 0.5, and the EDNAFULL (EMBOSS version of NCBI NUC4.4) substitution matrix. The output of Needle labeled "longest identity" (obtained using the -nobrief option) is used as the percent identity and is calculated as follows:

(Identical Deoxyribonucleotides×100)/(Length of
Alignment−Total Number of Gaps in Alignment)

Stringency conditions: The term "very low stringency conditions" means for probes of at least 100 nucleotides in length, prehybridization and hybridization at 42° C. in 5×SSPE, 0.3% SDS, 200 micrograms/ml sheared and denatured salmon sperm DNA, and 25% formamide, following standard Southern blotting procedures for 12 to 24 hours. The carrier material is finally washed three times each for 15 minutes using 2×SSC, 0.2% SDS at 45° C.

The term "low stringency conditions" means for probes of at least 100 nucleotides in length, prehybridization and hybridization at 42° C. in 5×SSPE, 0.3% SDS, 200 micrograms/ml sheared and denatured salmon sperm DNA, and 25% formamide, following standard Southern blotting procedures for 12 to 24 hours. The carrier material is finally washed three times each for 15 minutes using 2×SSC, 0.2% SDS at 50° C.

The term "medium stringency conditions" means for probes of at least 100 nucleotides in length, prehybridization and hybridization at 42° C. in 5×SSPE, 0.3% SDS, 200 micrograms/ml sheared and denatured salmon sperm DNA, and 35% formamide, following standard Southern blotting procedures for 12 to 24 hours. The carrier material is finally washed three times each for 15 minutes using 2×SSC, 0.2% SDS at 55° C.

The term "medium-high stringency conditions" means for probes of at least 100 nucleotides in length, prehybridization and hybridization at 42° C. in 5×SSPE, 0.3% SDS, 200 micrograms/ml sheared and denatured salmon sperm DNA, and either 35% formamide, following standard Southern blotting procedures for 12 to 24 hours. The carrier material is finally washed three times each for 15 minutes using 2×SSC, 0.2% SDS at 60° C.

The term "high stringency conditions" means for probes of at least 100 nucleotides in length, prehybridization and hybridization at 42° C. in 5×SSPE, 0.3% SDS, 200 micrograms/ml sheared and denatured salmon sperm DNA, and 50% formamide, following standard Southern blotting procedures for 12 to 24 hours. The carrier material is finally washed three times each for 15 minutes using 2×SSC, 0.2% SDS at 65° C.

The term "very high stringency conditions" means for probes of at least 100 nucleotides in length, prehybridization and hybridization at 42° C. in 5×SSPE, 0.3% SDS, 200 micrograms/ml sheared and denatured salmon sperm DNA, and 50% formamide, following standard Southern blotting procedures for 12 to 24 hours. The carrier material is finally washed three times each for 15 minutes using 2×SSC, 0.2% SDS at 70° C.

Variant: The term "variant" means a polypeptide having lipolytic activity comprising an alteration, i.e., a substitution, insertion, and/or deletion, at one or more (e.g. several) positions. A substitution means replacement of the amino acid occupying a position with a different amino acid; a deletion means removal of the amino acid occupying a position; and an insertion means adding an amino acid adjacent to and immediately following the amino acid occupying a position.

Improved property: When incorporated into a dough in effective amounts, the polypeptide and the emulsifier, one or more properties of the dough or of the baked product obtained there from may be improved relative to a dough or a baked product in which the polypeptide and the emulsifier are not incorporated. The term "improved property" is defined herein as any property of a dough and/or a product obtained from the dough, particularly a baked product, which is improved by the action of the lipolytic enzyme and the emulsifier according to the invention or by the baking composition according to the invention relative to a dough or product in which the lipolytic enzyme and the emulsifier or composition according to the invention is not incorporated. The improved property may include, but is not limited to, increased strength of the dough, increased elasticity of the dough, increased stability, reduced stickiness of the dough, improved extensibility of the dough, improved machineability of the dough, increased volume of the baked product, improved flavor of the baked product, improved crumb structure of the baked product, improved crumb softness of the baked product, and/or improved anti-staling of the baked product.

The improved property may be determined by comparison of a dough and/or a baked product prepared with and without addition of the lipolytic enzyme and the emulsifier or of the baking composition of the present invention in accordance with the methods of present invention which are described below. Organoleptic qualities may be evaluated using procedures well established in the baking industry, and may include, for example, the use of a panel of trained taste-testers.

Increased strength: The term "increased strength of the dough" is defined herein as the property of a dough that has generally more elastic properties and/or requires more work input to mould and shape.

Increased elasticity: The term "increased elasticity of the dough" is defined herein as the property of a dough which has a higher tendency to regain its original shape after being subjected to a certain physical strain.

Increased stability of the dough: The term "increased stability of the dough" is defined herein as the property of a dough that is less susceptible to mechanical abuse thus better maintaining its shape and volume and is evaluated by the ratio of height:width of a cross section of a loaf after normal and/or extended proof.

Reduced stickiness of the dough: The term "reduced stickiness of the dough" is defined herein as the property of a dough that has less tendency to adhere to surfaces, e.g. in the dough production machinery, and is either evaluated empirically by the skilled test baker or measured by the use of a texture analyser (e.g. TAXT2) as known in the art.

Improved extensibility: The term "improved extensibility of the dough" is defined herein as the property of a dough that can be subjected to increased strain or stretching without rupture.

Improved machineability: The term "improved machineability of the dough" is defined herein as the property of a dough that is generally less sticky and/or more firm and/or more elastic.

Increased volume of the baked product: The term "increased volume of the baked product" is measured as the volume of a given loaf of bread. The volume may be determined by the rape seed displacement method.

Improved crumb structure of the baked product: The term "improved crumb structure of the baked product" is defined herein as the property of a baked product with finer cells and/or thinner cell walls in the crumb and/or more uniform/homogenous distribution of cells in the crumb and is usually evaluated visually by the baker or by digital image analysis as known in the art (eg. C-cell, Calibre Control International Ltd, Appleton, Warrington, UK).

Improved softness of the baked product: The term "improved softness of the baked product" is the opposite of "firmness" and is defined herein as the property of a baked product that is more easily compressed and is evaluated either empirically by the skilled test baker or measured by the use of a texture analyzer (e.g. TAXT2 or TA-XT Plus from Stable Micro Systems Ltd, surrey, UK) as known in the art.

Improved flavor of the baked product: The term "improved flavor of the baked product" is evaluated by a trained test panel.

Improved anti-staling of the baked product: The term "improved anti-staling of the baked product" is defined herein as the properties of a baked product that have a reduced rate of deterioration of quality parameters, e.g. softness and/or elasticity, during storage.

DETAILED DESCRIPTION OF THE INVENTION

The invention provides a method for preparing a dough or a baked product prepared from the dough which method comprises adding a lipolytic enzyme and an emulsifier to the dough. The invention also provides baking compositions, pre-mix, dough and baked products comprising a lipolytic enzyme and at least one emulsifier.

Polypeptides Having Lipolytic Activity

Polypeptides having lipolytic activity which are suitable for use in the present invention include polypeptide selected from the group consisting of;
  (i) a polypeptide having an amino acid sequence which has at least 70% sequence identity to the polypeptide of SEQ ID NO: 2; or to the mature polypeptide of SEQ ID NO: 2;
  (ii) a polypeptide encoded by a polynucleotide that hybridizes under high stringency conditions with (i) the mature polypeptide coding sequence of SEQ ID NO: 1, or (ii) the full-length complement of (i);
  (iii) a polypeptide encoded by a polynucleotide having at least 70% sequence identity to the mature polypeptide coding sequence of SEQ ID NO: 1;
  (iv) a variant of the mature polypeptide of SEQ ID NO: 2 comprising a substitution, deletion, and/or insertion at one or more (e.g. several) positions; and
  (v) a fragment of the polypeptide of (i), (ii), (iii), or (iv) that has lipolytic activity.

More preferred polypeptides having lipolytic activity which are suitable for use in the present invention include polypeptides having an amino acid sequence which has at least 75%, at least 80%, at least 85%, at least 90%, at least 95%, at least 99% of at least 99.5%, or even at least 100 sequence identity to the mature polypeptide of SEQ ID NO: 2; and/or polypeptides encoded by a polynucleotide having at least 75%, at least 80%, at least 85%, at least 90%, at least 95%, at least 99% or even at least 100 sequence identity to the mature polypeptide coding sequence of SEQ ID NO: 1.

In another aspect, the polypeptide comprises or consists of the polypeptide of SEQ ID NO: 2; or the mature polypeptide of SEQ ID NO: 2.

Another preferred polypeptide having lipolytic activity which is suitable for use in the present invention is the lipolytic enzyme from *Aspergillus japonicus* which was disclosed in PCT/JP2008/051386 published as WO 2008/093720 and is shown in SEQ ID NO: 3. Also suitable are polypeptides having an amino acid sequence which has at least 75%, at least 80%, at least 85%, at least 90%, at least 95%, at least 99% of at least 99.5%, or even at least 100 sequence identity to the polypeptide of SEQ ID NO: 2; or to the mature polypeptide of SEQ ID NO: 2; and/or polypeptides encoded by a polynucleotide having at least 75%, at least 80%, at least 85%, at least 90%, at least 95%, at least 99% or even 100% sequence identity to the lipolytic enzyme from *Aspergillus japonicus* shown in SEQ ID NO: 3.

In a particular aspect, the present invention relates to isolated polypeptides having a sequence identity to the polypeptide of SEQ ID NO: 2; or the mature polypeptide of SEQ ID NO: 2 of at least 99%, of at least 99.5%, or even 100%, which have lipolytic activity. In one aspect, the polypeptides differ by no more than 3 amino acids, e.g. 1, 2 or 3 from the polypeptide of SEQ ID NO: 2; or from the mature polypeptide of SEQ ID NO: 2.

Polypeptides having lipolytic activity which are suitable for use in the present invention preferably have The polynucleotide of SEQ ID NO: 1 or a subsequence thereof, as well as the polypeptide of SEQ ID NO: 2 or a fragment thereof may be used to design nucleic acid probes to identify and clone DNA encoding polypeptides having lipolytic activity from strains of different genera or species according to methods well known in the art (Sambrook et al., 1989, *Molecular Cloning, A Laboratory Manual*, 2d edition, Cold Spring Harbor, N.Y.). In particular, such probes can be used for hybridization with the genomic DNA or cDNA of a cell of interest, following standard Southern blotting procedures, in order to identify and isolate the corresponding gene therein. Such probes can be considerably shorter than the entire sequence, but should be at least 15, e.g. at least 25, at least 35, or at least 70 nucleotides in length. Preferably, the nucleic acid probe is at least 100 nucleotides in length, e.g. at least 200 nucleotides, at least 300 nucleotides, at least 400 nucleotides, at least 500 nucleotides, at least 600 nucleotides, at least 700 nucleotides, or at least 800 nucleotides in length. Both DNA and RNA probes can be used. The probes are typically labeled for detecting the corresponding gene (for example, with $^{32}P$, $^3H$, $^{35}S$, biotin, or avidin). Such probes are encompassed by the present invention.

A genomic DNA or cDNA library prepared from such other strains may be screened for DNA that hybridizes with the probes described above and encodes a polypeptide having lipolytic activity. Genomic or other DNA from such other strains may be separated by agarose or polyacrylamide gel electrophoresis, or other separation techniques. DNA from the libraries or the separated DNA may be transferred to and immobilized on nitrocellulose or other suitable carrier material. In order to identify a clone or DNA that hybridizes with SEQ ID NO: 1 or a subsequence thereof, the carrier material is used in a Southern blot.

For purposes of the present invention, hybridization indicates that the polynucleotide hybridizes to a labeled nucleic acid probe corresponding to (i) SEQ ID NO: 1; (ii) the mature polypeptide coding sequence of SEQ ID NO: 1; (iii) the full-length complement thereof; or (iv) a subsequence thereof; under very low to very high stringency conditions. Molecules to which the nucleic acid probe hybridizes under these conditions can be detected using, for example, X-ray film or any other detection means known in the art.

In another embodiment, the lipolytic enzyme suitable for use in the present invention is a variant of the mature polypeptide of SEQ ID NO: 2 or SEQ ID NO: 3 comprising a substitution, deletion, and/or insertion at one or more (e.g. several) positions. In an embodiment, the number of amino acid substitutions, deletions and/or insertions introduced into the mature polypeptide of SEQ ID NO: 2 or SEQ ID NO: 3 is not more than 10, e.g. 1, 2, 3, 4, 5, 6, 7, 8, 9 or 10. The amino acid changes may be of a minor nature, that is conservative amino acid substitutions or insertions that do not significantly affect the folding and/or activity of the protein; small deletions, typically of 1-30 amino acids; small amino- or carboxyl-terminal extensions, such as an amino-terminal methionine residue; a small linker peptide of up to 20-25 residues; or a small extension that facilitates purification by changing net charge or another function, such as a poly-histidine tract, an antigenic epitope or a binding domain.

Examples of conservative substitutions are within the groups of basic amino acids (arginine, lysine and histidine), acidic amino acids (glutamic acid and aspartic acid), polar amino acids (glutamine and asparagine), hydrophobic amino acids (leucine, isoleucine and valine), aromatic amino acids (phenylalanine, tryptophan and tyrosine), and small amino acids (glycine, alanine, serine, threonine and methionine). Amino acid substitutions that do not generally alter specific activity are known in the art and are described, for example, by H. Neurath and R. L. Hill, 1979, *In, The Proteins*, Academic Press, New York. Common substitutions are Ala/Ser, Val/Ile, Asp/Glu, Thr/Ser, Ala/Gly, Ala/Thr, Ser/Asn, Ala/Val, Ser/Gly, Tyr/Phe, Ala/Pro, Lys/Arg, Asp/Asn, Leu/Ile, Leu/Val, Ala/Glu, and Asp/Gly.

Single or multiple amino acid substitutions, deletions, and/or insertions can be made and tested using known methods of mutagenesis, recombination, and/or shuffling, followed by a relevant screening procedure, such as those disclosed by Reidhaar-Olson and Sauer, 1988, *Science* 241: 53-57; Bowie and Sauer, 1989, *Proc. Natl. Acad. Sci. USA* 86: 2152-2156; WO 95/17413; or WO 95/22625. Other methods that can be used include error-prone PCR, phage display (e.g. Lowman et al., 1991, *Biochemistry* 30: 10832-10837; U.S. Pat. No. 5,223,409; WO 92/06204), and region-directed mutagenesis (Derbyshire et al., 1986, *Gene* 46: 145; Ner et al., 1988, *DNA* 7: 127).

Mutagenesis/shuffling methods can be combined with high-throughput, automated screening methods to detect activity of cloned, mutagenized polypeptides expressed by host cells (Ness et al., 1999, *Nature Biotechnology* 17: 893-896). Mutagenized DNA molecules that encode active polypeptides can be recovered from the host cells and rapidly sequenced using standard methods in the art. These methods allow the rapid determination of the importance of individual amino acid residues in a polypeptide.

Sources of Polypeptides Having Lipolytic Activity

A polypeptide having lipolytic activity may be obtained from microorganisms of any genus.

The polypeptide may be a fungal polypeptide. For example, the polypeptide may be a yeast polypeptide such as a *Candida, Kluyveromyces, Pichia, Saccharomyces, Schizosaccharomyces*, or *Yarrowia* polypeptide; or a filamentous fungal polypeptide such as an *Acremonium, Agaricus, Alternaria, Aspergillus, Aureobasidium, Botryospaeria, Ceriporiopsis, Chaetomidium, Chrysosporium, Claviceps, Cochliobolus, Coprinopsis, Coptotermes, Corynascus, Cryphonectria, Cryptococcus, Diplodia, Exidia, Filibasidium, Fusarium, Gibberella, Holomastigotoides, Humicola, Irpex, Lentinula, Leptospaeria, Magnaporthe, Melanocarpus, Meripilus, Mucor, Myceliophthora, Neocallimastix, Neurospora, Paecilomyces, Penicillium, Phanerochaete, Piromyces, Poitrasia, Pseudoplectania, Pseudotrichonympha, Rhizomucor, Schizophyllum, Scytalidium, Talaromyces, Thermoascus, Thielavia, Tolypocladium, Trichoderma, Trichophaea, Verticillium, Volvariella*, or *Xylaria* polypeptide.

In another aspect, the polypeptide is an *Acremonium cellulolyticus, Aspergillus aculeatus, Aspergillus awamori, Aspergillus foetidus, Aspergillus fumigatus, Aspergillus japonicus, Aspergillus nidulans, Aspergillus niger, Aspergillus oryzae, Aspergillus aculeatus Chrysosporium inops, Chrysosporium keratinophilum, Chrysosporium lucknowense, Chrysosporium merdarium, Chrysosporium pannicola, Chrysosporium queenslandicum, Chrysosporium tropicum, Chrysosporium zonatum, Fusarium bactridioides, Fusarium cerealis, Fusarium crookwellense, Fusarium culmorum, Fusarium graminearum, Fusarium graminum, Fusarium heterosporum, Fusarium negundi, Fusarium oxysporum, Fusarium reticulatum, Fusarium roseum, Fusarium sambucinum, Fusarium sarcochroum, Fusarium sporotrichioides, Fusarium sulphureum, Fusarium torulosum, Fusarium trichothecioides, Fusarium venenatum, Humicola grisea, Humicola insolens, Humicola lanuginosa, Irpex lacteus, Mucor miehei, Myceliophthora thermophila, Neurospora crassa, Penicillium funiculosum, Penicillium purpurogenum, Phanerochaete chrysosporium, Thielavia achromatica, Thielavia albomyces, Thielavia albopilosa, Thielavia australeinsis, Thielavia fimeti, Thielavia microspora, Thielavia ovispora, Thielavia peruviana, Thielavia setosa, Thielavia spededonium, Thielavia subthermophila, Thielavia terrestris, Trichoderma harzianum, Trichoderma koningii, Trichoderma longibrachiatum, Trichoderma reesei*, or *Trichoderma viride* polypeptide.

It will be understood that for the aforementioned species, the invention encompasses both the perfect and imperfect states, and other taxonomic equivalents, e.g. anamorphs, regardless of the species name by which they are known. Those skilled in the art will readily recognize the identity of appropriate equivalents.

Strains of these species are readily accessible to the public in a number of culture collections, such as the American Type Culture Collection (ATCC), Deutsche Sammlung von Mikroorganismen and Zellkulturen GmbH (DSMZ), Centraalbureau Voor Schimmelcultures (CBS), and Agricultural Research Service Patent Culture Collection, Northern Regional Research Center (NRRL).

The polypeptide may be identified and obtained from other sources including microorganisms isolated from nature (e.g. soil, composts, water, etc.) or DNA samples obtained directly from natural materials (e.g. soil, composts, water, etc.) using the above-mentioned probes. Techniques for isolating microorganisms and DNA directly from natural habitats are well known in the art. A polynucleotide encoding the polypeptide may then be obtained by similarly screening a genomic DNA or cDNA library of another microorganism or mixed DNA sample. Once a polynucleotide encoding a polypeptide has been detected with the probe(s), the polynucleotide can be isolated or cloned by utilizing techniques that are known to those of ordinary skill in the art (see, e.g. Sambrook et al., 1989, supra).

Emulsifiers

A suitable emulsifier for use in the present invention is preferably an emulsifier selected from the group consisting of diacetyl tartaric acid esters of monoglycerides (DATEM), sodium stearoyl lactylate (SSL), calcium stearoyl lactylate (CSL), ethoxylated mono- and diglycerides (EMG), polysorbates (PS), and succinylated monoglycerides (SMG).

Most preferably the emulsifier is DATEM, SSL or CSL.

DATEM is composed of mixed esters of glycerol in which one or more of the hydroxyl groups of glycerol has been esterified by diacetyl tartaric acid and by fatty acids. The ingredient is prepared by the reaction of diacetyl tartaric anhydride with mono- and diglycerides that are derived from edible sources. The major components are a glycerol molecule with a stearic acid residue, a diacetyltartaric acid residue and a free secondary hydroxyl group.

SSL and CSL are made from the fatty acid stearic acid esterified with a double ester of lactic acid. SSL and CSL are especially suitable for baked products with soft crust.

In commercial baking emulsifiers, such as DATEM, SSL and CSL, are typically used in amounts of 0.3 to 0.5% of the total flour weight.

Compositions Comprising a Lipolytic Enzyme and an Emulsifier

The present invention relates to compositions comprising a lipolytic enzyme and an emulsifier and their preparation, e.g. compositions suitable for increasing the loaf volume of a baked product.

The composition may further comprise one or more additional enzymes, in particular amylase, glucanase, galactanase, mannanase, aminopeptidase, alpha-amylase, maltogenic alpha-amylase, beta-amylase, carboxypeptidase, catalase, chitinase, cutinase, cyclodextrin glycosyltransferase, deoxyribonuclease, esterase, alpha-galactosidase, beta-galactosidase, glucoamylase, alpha-glucosidase, beta-glucosidase, haloperoxidase, invertase, laccase, lipase, phospholipase, mannosidase, oxidase, pectinolytic enzymes, peptidoglutaminase, peroxidase, phytase, polyphenoloxidase, proteolytic enzyme, ribonuclease, or transglutaminase.

The compositions may be prepared in accordance with methods known in the art and may have any physical appearance such as liquid, paste or solid. For instance, the composition may be formulated using methods known to the art of formulating enzymes and/or pharmaceutical products, e.g. into coated or uncoated granules or micro-granules. The lipolytic enzyme, the emulsifier, and any additional enzymes to be included in the composition may be stabilized in accordance with methods known in the art e.g. by stabilizing the polypeptide in the composition by adding and antioxidant or reducing agent to limit oxidation or the polypeptide of it may be stabilized by adding polymers such as PVP, PVA, PEG or other suitable polymers known to be beneficial to the stability of polypeptides in solid or liquid compositions. When formulating a lipolytic enzyme, and an emulsifier as a granulate or agglomerated powder the particles particularly have a narrow particle size distribution with more than 95% (by weight) of the particles in the range from 25 to 500 µm. Granulates and agglomerated powders may be prepared by conventional methods, e.g. by spraying a lipolytic enzyme and the emulsifier, onto a carrier in a fluid-bed granulator. The carrier may consist of particulate cores having a suitable particle size. The carrier may be soluble or insoluble, e.g. a salt (such as NaCl or sodium sulfate), a sugar (such as sucrose or lactose), a sugar alcohol (such as sorbitol), starch, rice, corn grits, or soy. The composition is preferably in the form of a dry powder or a granulate, in particular a non-dusting granulate.

Hence, the invention also provides a granule comprising a lipolytic enzyme, and an emulsifier.

In a particular embodiment, the composition is a dough composition or a dough improving additive or a premix comprising a lipolytic enzyme, and an emulsifier.

The term "pre-mix" is defined herein to be understood in its conventional meaning, i.e., as a mix of baking agents, generally including flour, which may be used not only in industrial bread-baking plants, but also in retail bakeries.

The pre-mix may be prepared by mixing the baking composition of the invention with a suitable carrier such as flour, starch, a sugar, a complex carbohydrate such as maltodextrin, or a salt. The pre-mix may contain other dough and/or bread additives, e.g. any of the additives, including enzymes, mentioned herein.

The amount of the lipolytic enzyme in the composition may be between 0.5-5000 mg polypeptide per kg dry matter, 1.0-1000 mg polypeptide per kg dry matter, 5.0-100 mg polypeptide per kg dry matter, 5.0-50 mg polypeptide per kg dry matter, 5.0-25 mg polypeptide per kg dry matter, 5.0-15 mg polypeptide per kg dry matter, or more preferably 5.0-10 mg/kg per kg dry matter.

The amount of the emulsifier in the composition may be from 0.1 to 99%, from 1 to 70%, from 5 to 50%, from 15 to 45%, from 20 to 40%, or more preferably from 25 to 35%.

The Additional Enzymes

Optionally, additional enzymes, amylase, glucanase, galactanase, mannanase, aminopeptidase, alpha-amylase, maltogenic alpha-amylase, beta-amylase, carboxypeptidase, catalase, chitinase, cutinase, cyclodextrin glycosyltransferase, deoxyribonuclease, esterase, alpha-galactosidase, beta-galactosidase, glucoamylase, alpha-glucosidase, beta-glucosidase, haloperoxidase, invertase, laccase, lipase, phospholipase, mannosidase, oxidase, pectinolytic enzymes, peptidoglutaminase, peroxidase, phytase, glucose oxidase, polyphenoloxidase, proteolytic enzyme, ribonuclease, or transglutaminase may be used together with the lipolytic enzyme and the emulsifier in the dough or the composition. The additional enzyme may be of any origin, including mammalian and plant, and preferably of microbial (bacterial, yeast or fungal) origin.

The glucoamylase for use in the present invention include glucoamylases having a sequence identity of at least 50%, at least 60%, at least 65%, at least 70%, at least 75%, at least 80%, at least 85%, at least 90%, at least 95%, at least 96%, at least 97%, at least 98%, or at least 99% to the amino acid sequence of the *A. niger* G1 or G2 glucoamylase (Boel et al. (1984), EMBO J. 3 (5), p. 1097-1102), the *A. awamori* glucoamylase disclosed in WO 84/02921, or the *A. oryzae* glucoamylase (Agric. Biol. Chem. (1991), 55 (4), p. 941-949).

The amylase may be fungal or bacterial, e.g. a maltogenic alpha-amylase from *B. stearothermophilus* or an alpha-amylase from *Bacillus*, e.g. *B. licheniformis* or *B. amyloliquefaciens*, a beta-amylase, e.g. from plant (e.g. soy bean) or from microbial sources (e.g. *Bacillus*), a glucoamylase, e.g. from *A. niger*, or a fungal alpha-amylase, e.g. from *A. oryzae*.

Suitable commercial maltogenic alpha-amylases include NOVAMYL and OPTICAKE (available from Novozymes A/S). Suitable commercial fungal alpha-amylase compositions include, e.g. BAKEZYME P 300 (available from DSM) and FUNGAMYL 2500 SG, FUNGAMYL 4000 BG, FUNGAMYL 800 L, FUNGAMYL ULTRA BG and FUNGAMYL ULTRA SG (available from Novozymes A/S).

The glucose oxidase may be a fungal glucose oxidase, in particular an *Aspergillus niger* glucose oxidase (such as GLUZYME®, available from Novo Nordisk A/S, Denmark).

The hemicellulase may be a pentosanase, e.g. a xylanase which may be of microbial origin, e.g. derived from a bacterium or fungus, such as a strain of *Aspergillus*, in particular of *A. aculeatus*, *A. niger*, *A. awamori*, or *A. tubigensis*, from a strain of *Trichoderma*, e.g. *T. reesei*, or from a strain of *Humicola*, e.g. *H. insolens*.

Suitable commercially available xylanase preparations for use in the present invention include PANZEA BG, PENTOPAN MONO BG and PENTOPAN 500 BG (available from Novozymes), GRINDAMYL POWERBAKE (available from Danisco), and BAKEZYME BXP 5000 and BAKEZYME BXP 5001 (available from DSM).

The protease may be from *Bacillus*, e.g. *B. amyloliquefaciens*.

The phospholipase may have phospholipase A1, A2, B, C, D or lysophospholipase activity; it may or may not have lipase activity. It may be of animal origin, e.g. from pancreas, snake venom or bee venom, or it may be of microbial origin, e.g. from filamentous fungi, yeast or bacteria, such as *Aspergillus* or *Fusarium*, e.g. *A. niger*, *A. oryzae* or *F. oxysporum*. A preferred lipase/phospholipase from *Fusarium oxysporum* is disclosed in WO 98/26057. Also, the variants described in WO 00/32758 may be used.

The additional enzyme may be of any origin, including mammalian and plant, and preferably of microbial (bacterial, yeast or fungal) origin and may be obtained by techniques conventionally used in the art.

Suitable phospholipase compositions are LIPOPAN F and LIPOPAN XTRA (available from Novozymes) or PANAMORE GOLDEN and PANAMORE SPRING (available from DSM).

Dough

In an aspect, the invention discloses a method for preparing a dough or a baked product prepared from the dough which method comprises incorporating into the dough a lipolytic enzyme and an emulsifier.

In another aspect, the invention provides a dough comprising flour, water, and an effective amount of a baking composition or a premix according to the invention.

The present invention also relates to methods for preparing a dough or a baked product comprising incorporating into the dough an effective amount of a baking composition of the present invention which improves one or more properties of the dough or the baked product obtained from the dough relative to a dough or a baked product in which the polypeptide is not incorporated.

The phrase "incorporating into the dough" is defined herein as adding the baking composition according to the invention to the dough, to any ingredient from which the dough is to be made, and/or to any mixture of dough ingredients from which the dough is to be made. In other words, the baking composition of the invention may be added in any step of the dough preparation and may be added in one, two or more steps. The composition is added to the ingredients of a dough that is kneaded and baked to make the baked product using methods well known in the art.

The term "effective amount" is defined herein as an amount of baking composition according to the invention that is sufficient for providing a measurable effect on at least one property of interest of the dough and/or baked product.

The term "dough" is defined herein as a mixture of flour and other ingredients firm enough to knead or roll.

The dough of the invention may comprise flour derived from any cereal grain, including wheat, barley, rye, oat, corn, sorghum, rice and millet.

The dough may also comprise other conventional dough ingredients, e.g.: proteins, such as milk powder, gluten, and soy; eggs (either whole eggs, egg yolks or egg whites); an oxidant such as ascorbic acid, potassium bromate, potassium iodate, azodicarbonamide (ADA) or ammonium persulfate; an amino acid such as L-cysteine; a sugar; a salt such as sodium chloride, calcium acetate, sodium sulfate or calcium sulfate.

The dough may comprise fat (triglyceride) such as granulated fat or shortening, but the invention is particularly applicable to a dough where less than 1% by weight of fat is added, and particularly to a dough which is made without addition of fat.

According to the invention the dough comprise an emulsifier selected from the group consisting of diacetyl tartaric acid esters of monoglycerides (DATEM), sodium stearoyl lactylate (SSL), calcium stearoyl lactylate (CSL), ethoxylated mono- and diglycerides (EMG), polysorbates (PS), succinylated monoglycerides (SMG) and mixtures thereof.

The dough of the invention may be fresh, frozen or par-baked (pre-baked).

The dough of the invention is normally a leavened dough or a dough to be subjected to leavening. The dough may be leavened in various ways, such as by adding chemical leavening agents, e.g. sodium bicarbonate or by adding a leaven (fermenting dough), but it is preferred to leaven the dough by adding a suitable yeast culture, such as a culture of *Saccharomyces cerevisiae* (baker's yeast), e.g. a commercially available strain of *S. cerevisiae*.

The amount of lipolytic enzyme in the dough may be between 0.01-100 mg polypeptide per kg flour in the dough, in particular 0.05-50 mg polypeptide per kg flour, in particular 0.1-25 mg polypeptide per kg flour, in particular 0.1-15 mg polypeptide per kg flour in the dough, in particular 0.1 to 0.5 mg/kg flour, such as e.g., 0.3 mg/kg flour.

The amount of emulsifier in the dough may be between 0.01% and 0.5%. Preferably the amount of emulsifier in the dough is between 0.05% and 0.2%, such as around 0.1%. The emulsifier is preferably added in an amount of 50% or less of a standard dose if the emulsifier was added without the lipolytic enzyme.

Baked Product

The process of the invention may be used for any kind of baked product prepared from dough, either of a soft or a crisp character, either of a white, light or dark type. Examples are bread (in particular white, whole-meal or rye bread), typically in the form of loaves or rolls, French baguette-type bread, pita bread, tortillas, cakes, pancakes, biscuits, wafers, cookies, pie crusts, crisp bread, steamed bread, pizza and the like.

The present invention is further described by the following examples that should not be construed as limiting the scope of the invention.

Lipolytic Activity (LU)

The lipolytic activity may be determined using tributyrine as substrate. This method is based on the hydrolysis of tributyrin by the enzyme, and the alkali consumption to keep pH constant during hydrolysis is registered as a function of time.

One Lipase Unit (LU) is defined as the amount of enzyme which, under standard conditions (i.e. at 30° C.; pH 7.0; with 0.1% w/v Gum Arabic as emulsifier and 0.16 M tributyrine as substrate) liberates 1 micromol titrable butyric acid per minute.

Phospholipase Activity (LEU)

In the LEU assay, the phospholipase activity is determined from the ability to hydrolyze lecithin at pH 8.0, 40° C. The hydrolysis reaction can be followed by titration with NaOH for a reaction time of 2 minutes. The phospholipase from porcine pancreas has an activity of 510 LEU/mg (taken as standard), and the phospholipase from *Fusarium oxysporum* (Lipopan F) has an activity of 1540 LEU/mg.

Materials and Methods

Media and Solutions

Enzymes

*Aspergillus aculeatus* lipase (AaL): A composition comprising the polypeptide having the amino acid sequence shown as SEQ ID NO: 2 herein.

Lipopan F (LipF): A composition comprising the *Fusarium oxysporum* polypeptide having the amino acid sequence shown as SEQ ID NO: 2 in WO199826057.

Example 1

Doughs were prepared by mixing 100 parts (by weight) of wheat flour (Kolibri, Meneba), 4 parts of yeast, 1.5 parts of salt, 1.5 parts of sugar, 57.5 parts of water and 0.006 parts of ascorbic acid. All ingredients were added to the mixing bowl and mixed for 3 min at 90 rpm and 6 min at 150 rpm. After 20 min resting, the dough was scaled into smaller pieces of 350 g and again left to rest for 15 min. After sheeting and molding, the dough was placed in a pan and fermented for 55 min at 32° C. and 86% relative humidity and baked for 35 min at 230° C.

The mean value of the volumes of 4 loaves was measured using the traditional rape seed method. The specific volume was calculated as ml per g. The specific volume of the control (without enzyme) was defined as 100. The relative specific volume index was calculated as the percentage of the specific volume of 4 loaves per the specific volume of 4 control loaves.

The treatments are shown in table 1 and the specific volumes of the baked breads are shown in Table 2.

TABLE 1

Straight dough was prepared with the following combinations of DATEM and lipase.

|  | 1 Control | 2 | 3 | 4 | 5 | 6 | 7 |
|---|---|---|---|---|---|---|---|
| AaL (mg EP/kg flour) |  |  |  |  |  | 0.3 | 0.3 |
| LipF (LU/kg flour) |  |  |  | 700* | 700* |  |  |
| DATEM (%) |  | 0.1 | 0.4 |  | 0.1 |  | 0.1 |

*corresponding to ~0.3 mg EP/kg flour

TABLE 2

Volume of bread baked from dough with different combinations of DATEM and lipase

|  | Treatment | Specific volume (ml/g) | Specific volume Index |
|---|---|---|---|
| 1 | Control | 3.9 | 100 |
| 2 | DATEM (0.1%) | 4.1 | 105 |
| 3 | DATEM (0.4%) | 4.5 | 114 |
| 4 | LipF (700 LU) | 4.6 | 119 |
| 5 | LipF (700 LU) + DATEM (0.1%) | 4.6 | 119 |
| 6 | AaL (0.3 mg) | 3.7 | 94 |
| 7 | AaL (0.3 mg) + DATEM (0.1%) | 4.5 | 116 |

The combination of DATEM and AaL resulted in a higher volume relative to applying DATEM and AaL separately. The volume increase was not additive as 0.1% DATEM alone only resulted in a 5% volume increase and 0.3 mg AaL alone did not result in a positive volume increase. This is surprising as adding 0.1% DATEM together with 700 LU Lipopan F did not results in a higher volume relative to applying Lipopan F alone.

Example 2

Doughs were prepared by mixing 100 parts (by weight) of wheat flour (Kolibri, Meneba), 4 parts of yeast, 1.5 parts of salt, 1.5 parts of sugar, 57.5 parts of water and 0.006 parts of ascorbic acid. All ingredients were added to the mixing bowl and mixed for 3 min at 90 rpm and 6 min at 150 rpm. After 20 min resting, the dough was scaled into smaller pieces of 350 g and again left to rest for 15 min. After sheeting and molding, the dough was placed in a pan and fermented for 55 min at 32° C. and 86% relative humidity and baked for 35 min at 230° C.

The mean value of the volumes of 4 loaves was measured using the traditional rape seed method. The specific volume was calculated as ml per g. The specific volume of the control (without enzyme) was defined as 100. The relative specific volume index was calculated as the percentage of the specific volume of 4 loaves per the specific volume of 4 control loaves.

The treatments are shown in table 3 and the specific volumes of the baked breads are shown in Table 4.

TABLE 3

Straight dough was prepared with the following combinations of SSL and lipase.

|  | 1 Control | 2 | 3 | 4 | 5 | 6 | 7 |
|---|---|---|---|---|---|---|---|
| AaL (mg EP/kg flour) |  |  |  |  |  | 0.3 | 0.3 |
| LipF (LU/kg flour) |  |  |  | 700* | 700* |  |  |
| SSL (%) |  | 0.1 | 0.38 |  | 0.1 |  | 0.1 |

*corresponding to ~0.3 mg EP/kg flour

TABLE 4

Volume of bread baked from dough with different combinations of SSL and lipase.

|  | Treatment | Specific volume (ml/g) | Specific volume Index |
|---|---|---|---|
| 1 | Control | 3.9 | 100 |
| 2 | SSL (0.1%) | 4.1 | 105 |
| 3 | SSL (0.38%) | 4.6 | 118 |
| 4 | LipF (700 LU) | 4.6 | 120 |
| 5 | LipF (700 LU) + SSL (0.1%) | 4.7 | 121 |
| 6 | AaL (0.3 mg) | 3.5 | 90 |
| 7 | AaL (0.3 mg) + SSL (0.1%) | 4.2 | 110 |

The combination of SSL and AaL resulted in a higher volume relative to applying SSL and AaL separately.

The volume increase was not additive as 0.1% SSL alone only resulted in a 5% volume increase and 0.3 mg AaL alone did not result in a positive volume increase. This is surprising as adding 0.1% SSL together with 700 LU Lipopan F only resulted in an insignificant volume increase relative to applying Lipopan F alone.

The invention claimed is:

1. A method for preparing a dough or a baked product prepared from the dough which method comprises incorporating into the dough a lipolytic enzyme and an emulsifier, wherein the lipolytic enzyme is an isolated polypeptide having an amino acid sequence which has at least 99% sequence identity to the mature polypeptide of SEQ ID NO: 2 and has lipolytic activity, and wherein the emulsifier is selected from the group consisting of diacetyl tartaric acid esters of monoglycerides (DATEM), sodium stearoyl lactylate (SSL), calcium stearoyl lactylate (CSL), ethoxylated mono- and diglycerides (EMG), polysorbates (PS), and succinylated monoglycerides (SMG).

2. The method according to claim 1, which further comprises adding to the dough an enzyme selected from the group consisting of amylase, glucanase, galactanase, mannanase, aminopeptidase, alpha-amylase, beta-amylase, carboxypeptidase, catalase, chitinase, cutinase, cyclodextrin glycosyltransferase, deoxyribonuclease, esterase, alpha-galactosidase, beta-galactosidase, glucoamylase, alpha-glucosidase, beta-glucosidase, haloperoxidase, invertase, laccase, lipase, phospholipase, mannosidase, oxidase, pectinolytic enzymes, peptidoglutaminase, protease, peroxidase, phytase, polyphenoloxidase, and maltogenic alpha-amylase.

3. The method according to claim 1, wherein the lipolytic enzyme is applied in an amount of 0.01-100 mg polypeptide per kg flour.

4. The method according to claim 1, wherein the lipolytic enzyme is applied in an amount of 0.05-50 mg polypeptide per kg flour.

5. The method according to claim 1, wherein the lipolytic enzyme is applied in an amount of 0.1-25 mg polypeptide per kg flour.

6. The method according to claim 1, wherein the emulsifier is added in an amount of 0.01% and up to 0.5% of the total flour weight.

7. The method of claim 6, wherein the emulsifier is added in an amount up to 0.4% of the total flour weight.

8. The method of claim 6, wherein the emulsifier is added in an amount up to 0.2% of the total flour weight.

9. The method of claim 1, wherein the emulsifier is added in an amount of 50% or less of a standard dose if the emulsifier was added without the lipolytic enzyme.

10. The method of claim 1, wherein the emulsifier is DATEM.

11. The method of claim 1, wherein the emulsifier is diacetyl tartaric acid esters of monoglycerides (DATEM), sodium stearoyl lactylate (SSL) or calcium stearoyl lactylate (CSL).

12. A baking composition comprising an emulsifier and a lipolytic enzyme which is an isolated polypeptide having an amino acid sequence which has at least 99% sequence identity to the mature polypeptide of SEQ ID NO: 2 and has lipolytic activity, wherein the emulsifier is selected from the group consisting of diacetyl tartaric acid esters of monoglycerides (DATEM), sodium stearoyl lactylate (SSL), calcium stearoyl lactylate (CSL), ethoxylated mono- and diglycerides (EMG), polysorbates (PS), and succinylated monoglycerides (SMG).

13. The baking composition according to claim 12, which further comprises an enzyme selected from the group consisting of amylase, glucanase, galactanase, mannanase, aminopeptidase, alpha-amylase, beta-amylase, carboxypeptidase, catalase, chitinase, cutinase, cyclodextrin glycosyltransferase, deoxyribonuclease, esterase, alpha-galactosidase, beta-galactosidase, glucoamylase, alpha-glucosidase, beta-glucosidase, haloperoxidase, invertase, laccase, lipase, phospholipase, mannosidase, oxidase, pectinolytic enzymes, peptidoglutaminase, protease, peroxidase, phytase, polyphenoloxidase, and maltogenic alpha-amylase.

14. The baking composition according to claim 12, which further comprises an oxidant selected from the group consisting of ascorbic acid, potassium bromate, potassium iodate, azodicarbonamide (ADA) and ammonium persulfate.

15. A pre-mix comprising a baking composition according to claim 12, flour and one or more dough or bread additives.

16. A dough comprising flour, water and an amount of a baking composition according to claim 12.

17. The baking composition of claim 12, wherein the emulsifier is diacetyl tartaric acid esters of monoglycerides (DATEM), sodium stearoyl lactylate (SSL) or calcium stearoyl lactylate (CSL).

* * * * *